US012760201B2

(12) United States Patent
Ghasemi et al.

(10) Patent No.: US 12,760,201 B2
(45) Date of Patent: Oct. 13, 2026

(54) SCALABLE INTER-DIFFUSED ZWITTERIONIC POLYURETHANES FOR DURABLE ANTIBACTERIAL COATINGS

(71) Applicant: University of Houston System, Houston, TX (US)

(72) Inventors: Hadi Ghasemi, Spring, TX (US); Zixu Huang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 542 days.

(21) Appl. No.: 18/465,342

(22) Filed: Sep. 12, 2023

(65) Prior Publication Data

US 2024/0018388 A1 Jan. 18, 2024

Related U.S. Application Data

(62) Division of application No. 17/569,757, filed on Jan. 6, 2022.

(60) Provisional application No. 63/134,780, filed on Jan. 7, 2021.

(51) Int. Cl.

| | |
|---|---|
| ***C09D 175/12*** | (2006.01) |
| ***B05D 1/02*** | (2006.01) |
| ***B05D 1/38*** | (2006.01) |
| ***B05D 5/00*** | (2006.01) |
| ***B05D 7/00*** | (2006.01) |
| ***C08G 18/10*** | (2006.01) |
| ***C08G 18/32*** | (2006.01) |
| ***C08G 18/42*** | (2006.01) |
| ***C08G 18/73*** | (2006.01) |
| ***C08G 18/75*** | (2006.01) |
| ***C09D 5/14*** | (2006.01) |

(52) U.S. Cl.

CPC ............ *C09D 175/12* (2013.01); *B05D 1/38* (2013.01); *B05D 7/546* (2013.01); *C08G 18/10* (2013.01); *C08G 18/3275* (2013.01); *C08G 18/4263* (2013.01); *C08G 18/73* (2013.01); *C08G 18/755* (2013.01); *C09D 5/14* (2013.01); *B05D 1/02* (2013.01); *B05D 5/00* (2013.01); *B05D 2490/50* (2013.01); *B05D 2503/00* (2013.01)

(58) Field of Classification Search

CPC .................................................. C09D 175/12

See application file for complete search history.

(56) References Cited

FOREIGN PATENT DOCUMENTS

| | | | | |
|---|---|---|---|---|
| CN | 102942678 B | * | 3/2015 | |
| CN | 104403086 A | * | 3/2015 | C08G 18/831 |
| WO | WO-2018227587 A1 | * | 12/2018 | D04H 1/728 |

OTHER PUBLICATIONS

Translation of CN 104403086 (Year: 2015).*

* cited by examiner

*Primary Examiner* — Randy P Gulakowski
(74) *Attorney, Agent, or Firm* — Jackson Walker LLP

(57) ABSTRACT

Durable antibacterial coatings are prepared by inter-diffusing zwitterionic polyurethane in acrylic polyurethane. Bacterial attachment is substantially eliminated from the surface of the coatings due to the hydrophilicity of the zwitterionic polyurethane. Long-term antibacterial properties were observed for both Gram-negative and Gram-positive bacteria even when the coatings were constantly challenged by mechanical abrasion.

6 Claims, 10 Drawing Sheets

SCALABLE INTER-DIFFUSED ZWITTERIONIC POLYURETHANES FOR DURABLE ANTIBACTERIAL COATINGS

This application is a divisional of and claims priority to U.S. patent application Ser. No. 17/569,757, entitled "Scalable Inter-Diffused Zwitterionic Polyurethanes for Durable Antibacterial Coatings," filed Jan. 6, 2022, which claims priority to U.S. Provisional Patent Application Ser. No. 63/134,780, entitled "Scalable Inter-Diffused Zwitterionic Polyurethanes for Durable Antibacterial Coatings," filed Jan. 7, 2021, the entire contents of which are hereby incorporated by reference.

BACKGROUND

This disclosure pertains to durable antibacterial coatings.

Contamination of surfaces by initial bacterial settlement and subsequent biofilm formation have detrimentally impacted our daily life. In the past decades, the omnipresent bacterial attachment and biofilm formation on surfaces have facilitated the transmission of infectious diseases on global scale, inflicting significant public health concern and financial burden. Various surfaces including implantable devices, surgical equipment, and household canvas are potentially accounted to the wide spread of epidemics once infected with pathogenic bacteria. It has been reported that over 1.7 million people acquired nosocomial infections and approximately 98,000 patients have died as a result in the US.

Among the most frequently applied surfaces in both healthcare and household settings, acrylic polyurethane (APU) coatings are widely utilized due to combined advantages of tunable mechanical properties, excellent chemical resistance from polyurethane and desirable weatherability from the acrylic segments. However, the nature of hydrophobicity of the APUs compromises its ability to prevent biofilm formation due to the hydrophobic interactions between the surface and bacteria. To address this problem, enormous efforts had been adopted to render the PUs antimicrobial, including blending bactericidal additives into coating matrix, grafting bacteria-killing segments onto PU backbones, and constructing "smart" release technique of the bactericidal agents. The existing antibacterial coating surfaces are based on the release of bactericidal compounds, exhibiting limited long-term antibacterial efficacy due to the exhaustion of bactericidal agents. Moreover, the dead bacteria debris on the surfaces will hinder the bactericidal agents to be effectively released. None of these techniques have successfully demonstrated long-term antibacterial efficacy especially when the coating surfaces are challenged by mechanical damage.

In the past decades, surface hydration emerged as a new paradigm to combat bacterial colonization since a hydration layer consisting of tightly bounded water molecules on the PU coating surfaces functions as a physical and energetic barricade to hinder bacterial settlement. To date, a series of polymers have been successfully applied to construct hydrophilic layers on PU surfaces, including poly(ethylene glycol) (PEG), zwitterionic polymers, and poly(vinyl pyrrolidone) (PVP). Among them, zwitterionic polymers inspired by cell phospholipid layers which carry equivalent cationic and anionic groups with overall charge neutrality were intensively investigated owing to their outstanding non-fouling property since they can form hydration layers with water molecules via electrostatic attraction. Zwitterionic polymers can be categorized into three major types, namely poly (carboxybetaine) (PCB), poly(phosphobetaine) (PPB), and poly(sulfobetaine) (PSB). Due to the good tunability of PU structure, zwitterionic moieties can be readily built into the building blocks of PU by constructing hydrophilic or amphiphilic segments. Recently, Zhang et al. synthesized zwitterionic diol via radical polymerization of 3-mercapto-1,2-propanediol and 2-(dimethylamino)ethyl methacrylate for resisting nonspecific protein adsorption, but the final PU is not waterproof. Cheng et al. presented a self-generating zwitterionic PU hydrogel based on the self-catalyzed hydrolysis of the diethanolamino-N-hydroxyl ethyl acetate (DEAHA) cross-linker. This novel hydrogel exhibited long-lasting anti-biofouling properties against protein and biofilm formation. However, the inevitability of hydrolysis impeded the PU hydrogel for immediate use after preparation. Also, the hydrolysis may compromise the toughness of hydrogel.

SUMMARY

The present disclosure relates generally to antibacterial coatings. In particular, this disclosure relates to antibacterial zwitterionic polyurethane (ZPU) that forms an inter-diffused coating with acrylic polyurethane (APU) to produce a long-term durable antibacterial coating that eliminates undesired bacterial attachment on polyurethane (PU). The resulting bactericidal agent-free surfaces include bacteria-repelling hydration layers which constantly resist the attachment of bacteria. This technology shows desired long-term antibacterial property even when severely mechanically damaged.

The zwitterionic polyurethane (ZPU) disclosed herein has a high content of sulfobetaine zwitterionic moieties for enabling surface hydrophilicity to hydrophobic acrylic polyurethane (APU) via inter-diffused coating. The diffusion between ZPU and the underlying APU base ensures long-lasting surface hydrophilicity by allowing the zwitterionic moieties to be anchored into the interior of the coating films. Moreover, the excess ZPU on the surface during inter-diffusion also enhances biocompatibility by quenching the toxic isocyanate groups on the surface. Compared with simple blending of ZPU into APU as an additive, the route disclosed herein demonstrates improved toughness, such as at least 3.14 MPa, and superior antibacterial efficacy due to optimized film morphology and enriched ZPU on the coating surface. The antibacterial property against bacterial attachment was retained even after the coating surface was mechanically abraded for 1000 cycles. Moreover, the inter-diffused PU coating can also be readily applied onto a variety of surfaces, including metals, glass, polymers, and composites, on large scale via similar spray coating process. A relatively low batch-to-batch deviation and no delamination were observed, demonstrating that the PU coating is feasible to be easily scaled from laboratory to practical production.

DETAILED DESCRIPTION OF PREFERRED EMBODIMENTS

The present disclosure relates to durable antibacterial and antifouling polyurethane (PU) coatings and methods for their preparation. The present disclosure also relates to zwitterionic polyurethane (ZPU) having properties allowing it to diffuse into the interior of acrylic polyurethane (PU) coatings to produce a long-lasting antibacterial and antifouling coating.

The present disclosure also relates to a simplified route to prepare durable antifouling PU coatings based on the inter-diffusion of ZPUs and APUs without a hydrolysis process. To improve the diffusivity of ZPUs, a low molecular weight hydroxyl groups terminated prepolymer was synthesized using an unbalanced stoichiometric ratio between MDEA and IPDI. Then, the prepolymer was further quaternized with 1,3-propane sultone (1,3-PS) via ring-opening addition to obtain zwitterionic moieties in the ZPU. To improve the mechanical robustness of ZPU upon stretching and bending, a commercial grade acrylic polyol resin mixed with excess isocyanate cross-linker was utilized as the base layer for the ZPU. The phase segregation between the hydrophobic APU and the hydrophilic ZPU was prevented by spraying the ZPU polymer solution onto a partially cured APU layer. The diffusion of ZPU into the interior of APU coatings enabled durable surface hydrophilicity even when the coating was challenged by rigorous mechanical damages. The long-lasting antifouling property was attested by bacterial attachment assay on the abraded coating samples. Moreover, the scalability of the inter-diffused PU coating was also illustrated by applying the coating onto commercialized vinyl tarpaulin via the same route. Since the spray coating technique is compatible with large scale production, the novel antibacterial PU coating is feasible to be applied onto flexible substrates even with large dimensions.

Figure 1:
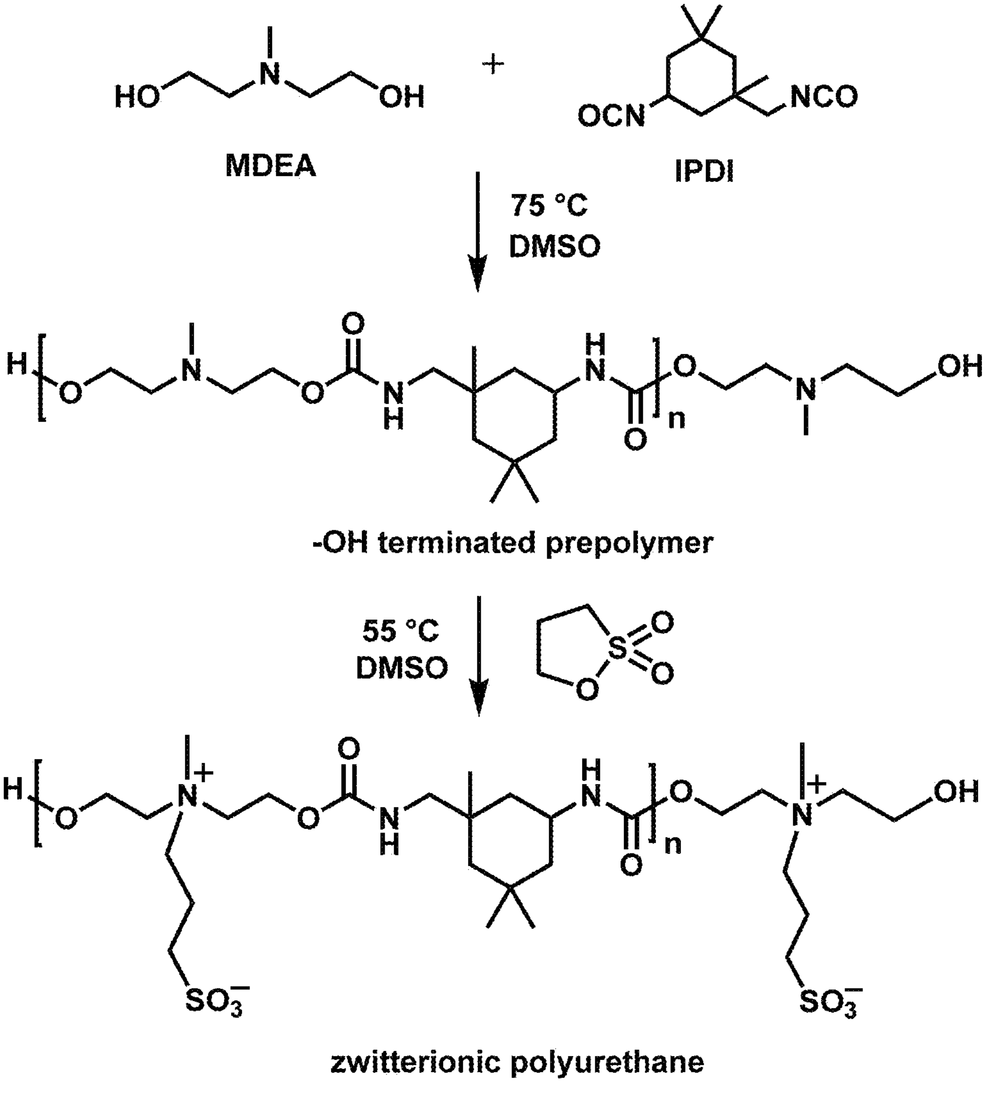
FIG. 1 shows an exemplary synthetic route for a zwitterionic polyurethane (ZPU) according to preferred embodiments described herein.

FIG. 1 shows an exemplary synthetic route for preferred embodiments of the zwitterionic polyurethane (ZPU). In preferred embodiments, methyl diethanolamine (MDEA) is combined with isophorone diisocyanate (IPDI) in a reaction vessel. Preferably, the ratio of hydroxyl groups in MDEA to isocyanate groups in IPDI is an unbalanced stoichiometric ratio, such as 1.1/1.0. In preferred embodiments, a solvent such as dimethyl sulfoxide (DMSO) is also added to the reaction mixture and the reaction vessel is bubbled with a gas such as Ar to remove oxygen. Next, in preferred embodiments, the reaction temperature is increased and an amount of catalyst such as dibutyltin dilaurate (DBTDL) is added to the reaction mixture to reduce viscosity, then the reaction mixture is cooled and 1,3-propane sultone (1,3-PS) is added to produce the ZPU. In further steps, in preferred embodiments, dry solvent such as DMSO is added to reduce viscosity in the reaction solution, the solution is concentrated and precipitated to remove unreacted MDEA and 1,3-PS, then the polymer precipitate is re-dissolved in solvent such as DMSO to form a concentrated solution, and then purified again by precipitation. In preferred embodiments, the final polymer is obtained by heating in a vacuum. In preferred embodiments, the resulting zwitterionic polyurethane (ZPU) has a structure shown below, where n is preferably between 2 and 70, and in preferred embodiments n is 18:

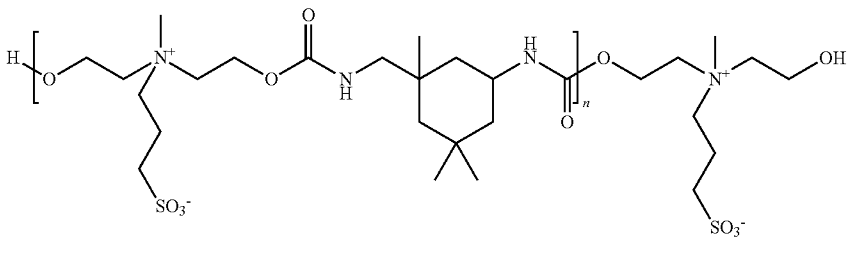

Low molecular weight PUs are favorable for diffusing into a hyperbranched polymer network due to their higher degree of freedom. The preferred embodiments of ZPU disclosed herein have relatively low molecular weight due to using an unbalanced molar ratio between hydroxyl groups in diol (MDEA) and isocyanate groups in diisocyanate (IPDI). The tertiary amine groups in the as-synthesized hydroxyl terminated PU prepolymer are quaternized with 1,3-PS to obtain zwitterionic moieties along the PU backbone.

Figure 2:
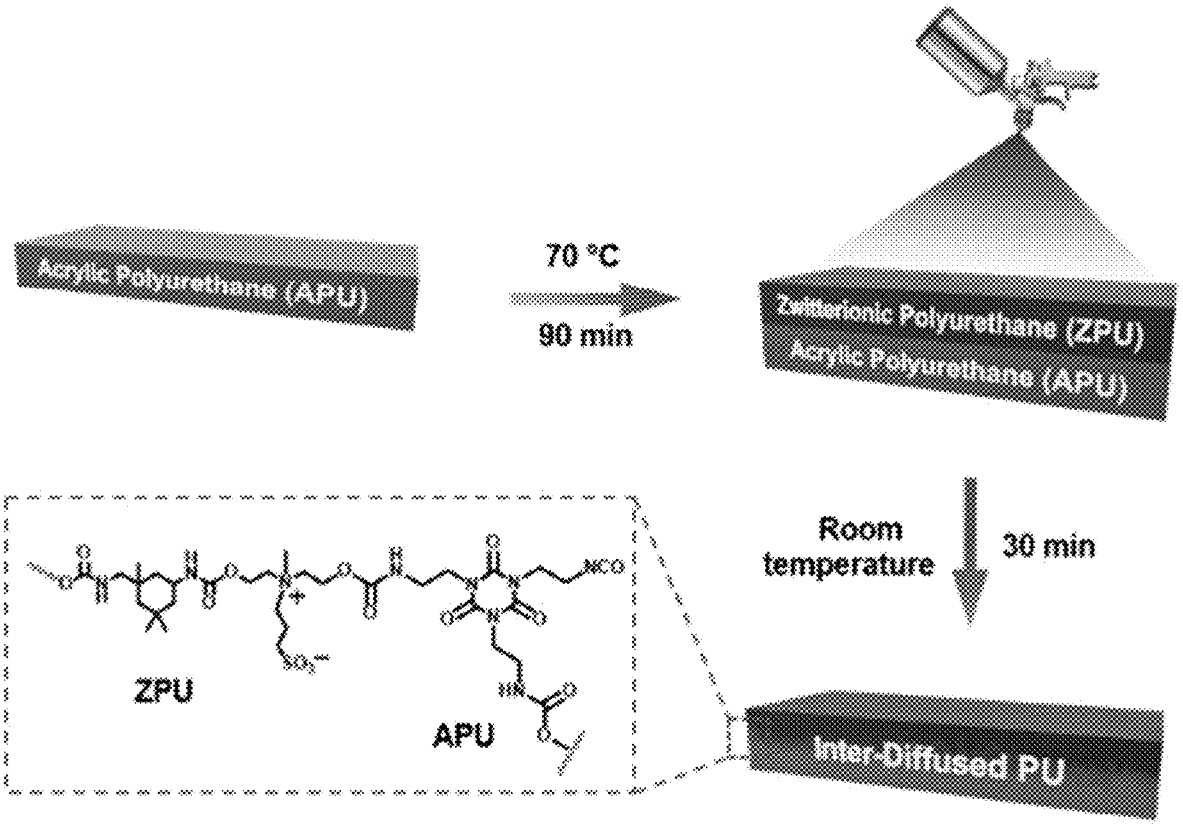
FIG. 2 shows a schematic illustration of an exemplary procedure for preparing an inter-diffused polyurethane (PU) coating according to preferred embodiments described herein.

In preferred embodiments, the durable inter-diffused PU antibacterial coatings described herein are prepared by a two-step technique. FIG. 2 shows a schematic illustration of an exemplary procedure for preparing the inter-diffused PU coating. In preferred embodiments, an acrylic polyurethane (APU) base layer is prepared by blending an acrylic polyol resin with a cross-linker such as hexamethylene diisocyanate (HDI), where the resulting resin preferably has a ratio of hydroxyl groups to isocyanate groups of about 1.0/1.5. In preferred embodiments, next steps include mixing an ester such as dry butyl acetate into the coating solution and degassing under reduced pressure. In preferred embodiments, the coating solution is cast onto a surface to form the APU base layer, which preferably has a thickness between about 1 and 2000 μm, and in preferred embodiments has a thickness of about 150 μm. The APU base layer is then preferably heated to achieve a semi-cured film. In further steps, in preferred embodiments, a solution of the ZPU in dry DMSO is then sequentially spray-coated onto the semi-cured APU base layer and allowed to inter-diffuse. Any superfluous ZPU solution is then preferably removed and the final inter-diffused PU coating is cured. In preferred embodiments, the resulting inter-diffused PU coating has a structure shown below:

mechanical toughness had ensured its long-lasting potency against bacterial settlement and proliferation. Compared to the APU and simple blended coating obtained from one-pot method, the inter-diffused PU coatings showed superior inhibitory efficacy for bacterial adherence throughout the initial settlement of the planktonic bacterial cells to the maturation of biofilms. Therefore, the disclosed methods, systems, and compositions provide a new paradigm for developing durable antibacterial PU coatings with high performance and easy scalability.

Preferred embodiments disclosed herein relate to a method for preparing an antibacterial polyurethane coating and for inhibiting bacterial attachment and biofilm formation on a surface, comprising a step of depositing an acrylic polyurethane base layer on the surface. In preferred embodiments, the surface can be any suitable surface in need of antibacterial properties, including but not limited to metals, glass, polymers, and composites. Additional suitable surfaces include vinyl tarpaulin, cotton canvas, polyester fabrics, and the like. The acrylic polyurethane base layer is preferably hydrophobic and has a ratio of hydroxyl groups to isocyanate groups of about 1.0/1.5. In certain preferred embodiments, the acrylic polyurethane base layer is prepared by blending acrylic polyol resin with an excess of hexamethylene diisocyanate cross-linker. The acrylic polyurethane base layer may be applied in varying thicknesses, such as between about 1 and 2000 μm, and in preferred embodiments about 150 μm. In further steps, the acrylic

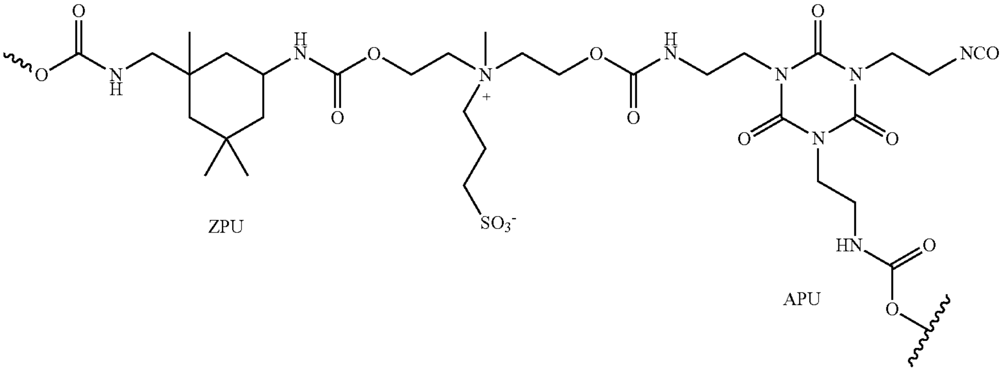

In the above structure, the wavy lines represent acrylic polyol resins with a hydroxyl content of about 50 to about 350 mg KOH/g, and preferably about 150 mg KOH/g. The resulting antibacterial PU coating can have variable thicknesses. In preferred embodiments, the inter-diffused PU coating can have a thickness between about 1 and 2000 μm, and in preferred embodiments the inter-diffused PU coating can have a thickness of about 180 μm.

Preferred embodiments disclosed herein include a facile route to synthesize zwitterionic PU and prepare durable hydrophilic PU coatings for impeding bacterial attachment and biofilm formation. Exemplary durable hydrophilic PU coatings were evaluated as described below. The ZPU was designed with a high content of zwitterionic moieties without any hydrophobic segments for maximum antibacterial performance. The brittleness of the ZPU was readily solved using a two-step coating method by spraying ZPU polymer solution onto semi-cured APU base to form an inter-diffused structure without evident phase separation between the hydrophilic ZPU and hydrophobic APU domains. The presence of the ZPU in the interior of the coatings as well as its polyurethane base layer is allowed to partially cure, to produce a semi-cured acrylic polyurethane base layer. In preferred embodiments, next steps include spraying a zwitterionic polyurethane on the semi-cured acrylic polyurethane base layer, where the zwitterionic polyurethane is hydrophilic and has a ratio of hydroxyl groups to isocyanate groups of about 1.1/1.0. The zwitterionic polyurethane may be formed according to the process in FIG. 1 and may have the structure shown in FIG. 1. The spray coating step may be repeated as many times as is suitable to provide sufficient coverage. The zwitterionic polyurethane may be sprayed as a solution having a concentration of about 20 mg/mL. In further steps, the zwitterionic polyurethane is allowed to inter-diffuse into the acrylic polyurethane base layer to form an inter-diffused polyurethane coating. The inter-diffusion step may occur for varying amounts of time, including about 30 minutes. Excess zwitterionic polyurethane may be removed once sufficient time has passed. The inter-diffused polyurethane coating is then cured to form an antibacterial polyurethane coating, wherein the antibacterial polyurethane coating has a coating surface that is hydrophilic and lacks isocyanate groups. The antibacterial polyurethane coating inhibits bacterial attachment and biofilm formation on the coating surface, Further aspects of the present invention will become apparent from the following description given by way of example only.

Example 1

Materials. Acrylic polyol resin (Macrynal SM516/70BAC) with a hydroxyl content of 150-200 mg KOH/g was provided by Allnex, Inc. Aliphatic isocyanate cross-linker (HDI trimer, Desmodur N3300A) with NCO content of 21.8% was supplied by Covestro, Inc. N-methyl diethanolamine (MDEA) was purchased from Alfa Aesar (Tewksbury, MA) and dried under reduced pressure before use. Isophorone diisocyanate (IPDI), anhydrous dimethyl sulfoxide (DMSO), dibutyltin dilaurate (DBTDL) was purchased from Sigma-Aldrich and used as received. 1,3-propane sultone (1,3-PS) was purchased from Acros Organics (Fair Lawn, NJ). *Escherichia coli* BL21 carrying green fluorescent protein (GFP) was purchased from Fisher Scientific. *Staphylococcus aureus* (ATCC 6538) was obtained from Supelco and cultured on a LB agar plate at 37° C. overnight.

Synthesis of zwitterionic polyurethane (ZPU). The hydroxyl terminated polyurethane prepolymer was synthesized with unbalanced stoichiometric ratio of hydroxyl groups in MDEA over isocyanate groups in IPDI of 1.1/1.0. The synthetic route was depicted generally in FIG. 1. Briefly, 6.55 g MDEA and 11.12 g IPDI was added into a 250 mL three-neck round bottom reaction flask equipped with condenser, followed by adding 30 mL of dry DMSO. The reaction flask was bubbled with Ar for 30 min to remove oxygen. Then, the reaction was initiated by increasing temperature to 80° C. and adding three droplets of DBTDL catalyst. After 4 h, the reaction was cooled to 55° C. and 6.72 g melted 1,3-PS was added into the flask in dropwise to obtain zwitterionic polyurethane (ZPU). 25 mL of dry DMSO was also added to reduce the viscosity of the reaction system. After 24 h, the polymer solution was concentrated by rotary evaporation then precipitated into excess cold acetone for removing unreacted MDEA and 1,3-PS. The polymer precipitate was re-dissolved into DMSO to form concentrated solution then purified for three more cycles by precipitation. The final polymer was obtained by heating in vacuum oven at 85° C. for 3 days.

The chemical composition and molar ratio of the zwitterionic moieties were characterized by $^1$H NMR. $^1$H NMR (600 MHz, DMSO-$d_6$) δ 8.06 (d, J=8.4 Hz, 2H), 7.56 (s, 1H), 7.46 (dd, J=17.3, 8.1 Hz, 1H), 7.34 (d, J=8.3 Hz, 2H), 4.44 (t, J=15.6 Hz, 6H), 4.06 (d, J=13.7 Hz, 1H), 3.91 (s, 1H), 3.74 (s, 5H), 3.67 (d, J=6.3 Hz, 1H), 3.59 (d, J=12.1 Hz, 4H), 3.52 (q, J=7.0 Hz, 2H), 3.21-3.16 (m, 4H), 2.83 (s, 2H), 2.62 (s, 7H), 2.11 (s, 3H), 1.86-1.81 (m, 1H), 1.54 (s, 4H), 1.19 (s, OH), 1.13 (t, J=7.0 Hz, 2H), 1.11-1.02 (m, 9H), 1.02-0.94 (m, 5H), (s, 1H). The signal at a chemical shift of 3.19 ppm was attributed to the methyl groups on the quaternary ammonium zwitterionic moieties. The methyl groups on the tertiary amine groups were detected at 2.11 ppm. Thus, a molar ratio of 57.1% for the tertiary amine groups successfully transformed into zwitterionic form was determined based on those peaks.

Preparation of the inter-diffused PU coating. The inter-diffused PU coatings were prepared by a two-step technique. FIG. 2 shows a general schematic for an exemplary procedure to prepare this coating. First, 10 g acrylic polyol resin (SM516) was blended with 5.36 g HDI cross-linker (N3300 A) to obtain a ratio of hydroxyl group over isocyanate group of 1.0/1.5. 15 mL of dry butyl acetate was thoroughly mixed into the coating solution followed by degassing under reduced pressure. The APU base layer was prepared by casting the coating solution onto a standard microscopic slide using a casting knife with a wet film thickness of 300 μm. The as-prepared APU base layer was then heated at 70° C. for 90 min to achieve a semi-cured film. Afterward, a solution of ZPU in dry DMSO at a concentration of 20 mg/mL was sequentially spray coated onto the semi-cured APU base and allowed to inter-diffuse for 30 min at room temperature. Then, the superfluous ZPU solution was removed by decantation and the PU coating was cured at ° C. for 2 days.

For comparison, an antifouling PU coating was also developed via a one-pot method by simple blending of ZPU and APU. Briefly, ZPU and acrylic polyol resins with equivalent amount of hydroxyl groups were mixed followed by adding HDI cross-linker into the mixture. The final mixture was diluted with butyl acetate and vacuum degassed thereafter.

Figure 3:
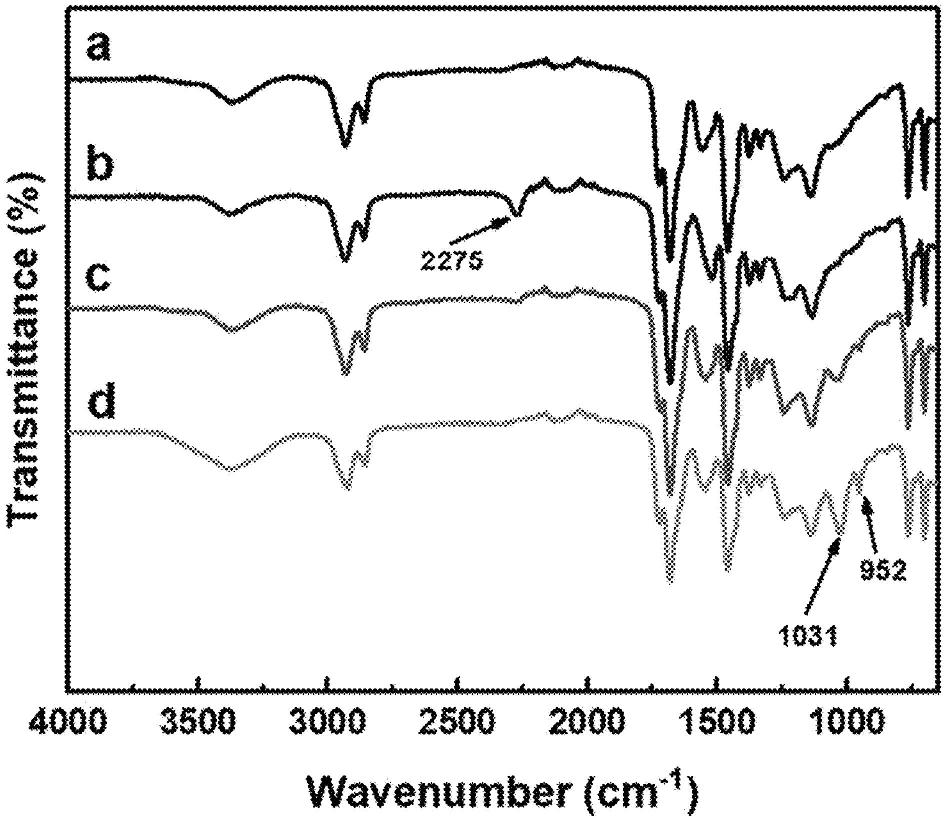
FIG. 3 shows attenuated total reflectance—Fourier transform infrared spectroscopy (ATR-FTIR) spectra of (a) acrylic polyurethane (APU) coating with NCO/OH molar ratio of 1/1, (b) APU coating base with NCO/OH molar ratio of 1.5/1.0, (c) antibacterial PU coating prepared through simple blending of APU, ZPU and cross-linker, and (d) inter-diffused antibacterial PU coating prepared via spray coating of ZPU onto semi-cured APU.

Attenuated total reflectance—Fourier transform infrared spectroscopy (ATR-FTIR). The chemical composition of the PU coating specimens was investigated by ATR-FTIR using an Agilent Cary 630 FTIR spectrometer with a ZnSe ATR module. Each specimen was measured in a range from 650 to 4000 $cm^{-1}$ for 32 scans with a spectral resolution of 8 $cm^{-1}$. FIG. 3 shows FTIR spectra for (a) APU coating with NCO/OH molar ratio of 1/1, (b) APU coating base with NCO/OH molar ratio of 1.5/1.0, (c) antibacterial PU coating prepared through simple blending of APU, ZPU and cross-linker, and (d) inter-diffused antibacterial PU coating prepared via spray coating of ZPU onto semi-cured APU. The broad adsorption band at 3400-3500 $cm^{-1}$ due to the stretching of —NH— linkage was ascribed to urethane groups. The strong adsorption peaks detected at 1680 $cm^{-1}$ was contributed by the C═O stretching owing to the carbonyl groups in both the acrylic polyol resin and urethane linkage. Strong signals were also observed at 1457 $cm^{-1}$ due to the deformation of methylene (—$CH_2$—) linkage. The excess amount of isocyanate groups was detected at 2275 $cm^{-1}$ from the APU coating base, which indicates hydroxyl terminated ZPU can be readily attached. Antifouling PU coating prepared from one-pot route by simple blending of ZPU, APU, and cross-linker was characterized with two new signals at 1031 and 952 $cm^{-1}$ which can be attributed to the sulfonate (—$SO_3$—) and quaternary ammonium (—$N^+$—) groups in the zwitterionic moieties. Moreover, substantially intensified signals were observed from two-step prepared inter-diffused antibacterial coating via spray coating. The surface enrichment of ZPU is favorable for the formation of surface hydration layer which suggests improved antibacterial properties. It is noteworthy that the isocyanate groups were completely consumed in the inter-diffused PU coating, which confirms the low toxicity and biocompatibility of the inter-diffused PU coating.

Figure 4:
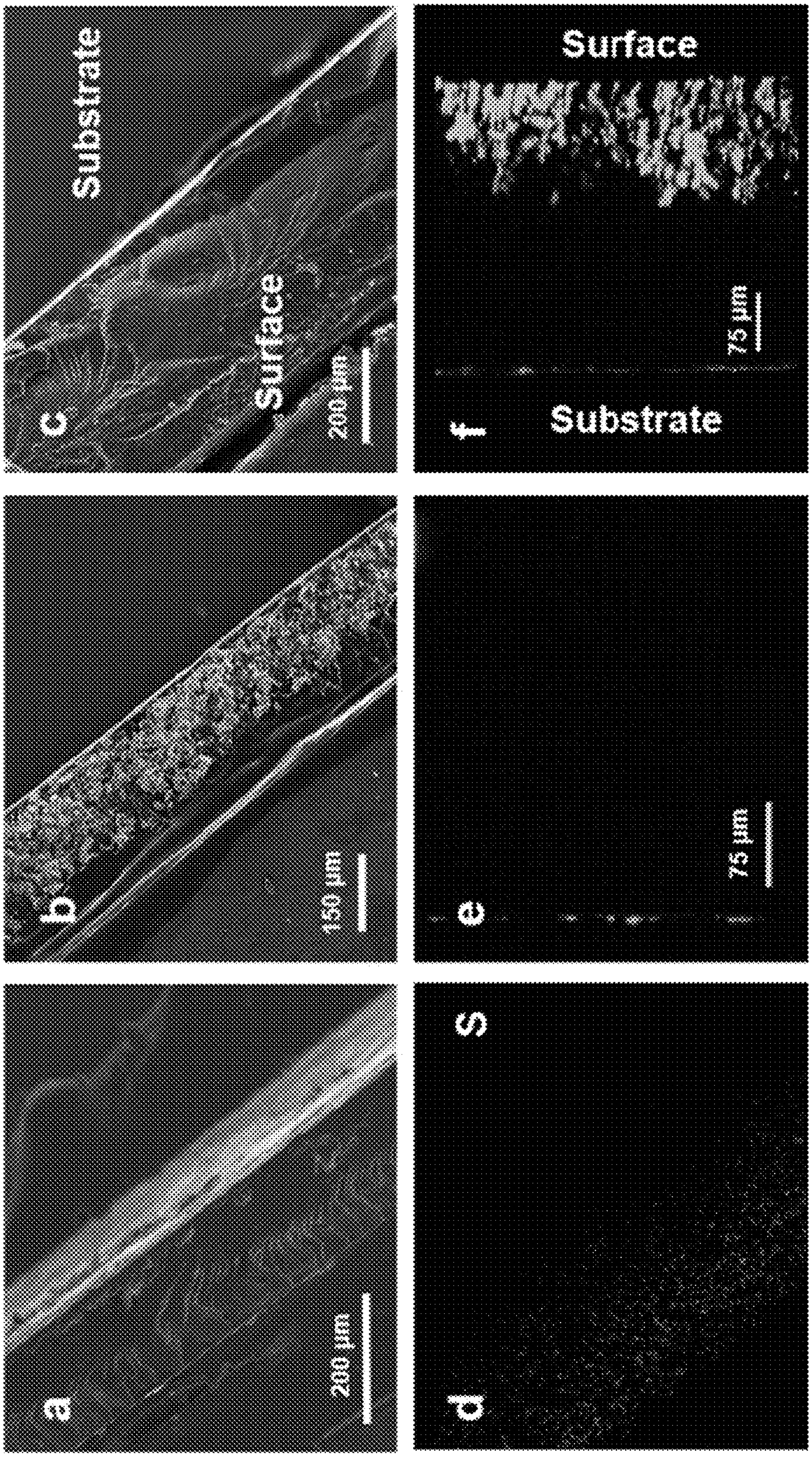
FIG. 4 shows cross-sectional SEM images of (a) APU coating, (b) antibacterial PU coating prepared by one-pot simple blending method, (c) inter-diffused antibacterial PU coating, and (d) EDS mapping for S atom distribution in inter-diffused PU coating, and cross-sectional CLSM images for (e) APU coating, and (f) inter-diffused antibacterial PU coating.

Scanning electron microscopy (SEM). To investigate the inter-diffusion behavior of the PU coatings, the cross-sectional morphology of different PU coatings was observed with SEM (JEOL, JSM 6330F). Coating specimen cross-sectioning was performed by immersing PU coatings into liquid nitrogen followed by immediate mechanical bending. A layer of graphite (~25 nm) was thus deposited to impart electrical conductivity. The SEM imaging was conducted at an accelerating voltage of 12 kV with a working distance of 15 mm. Energy dispersive spectroscopy (EDS) mapping was performed using a TEAM EDAX system (AMETEK, Berwyn, PA). FIG. 4 shows cross-sectional SEM images of (a) APU coating, (b) antibacterial PU coating prepared by one-pot simple blending method, and (c) inter-diffused antibacterial PU coating, (d) EDS mapping for S atom distribution in inter-diffused PU coating, and cross-sectional CLSM images for (e) APU coating and (f) inter-diffused antibacterial PU coating. Scale bars are shown in each image.

For pristine APU coating, a relatively featureless cross-section with channels formed by the evaporation of solvents was observed (FIG. 4(*a*)). As for the antibacterial PU coating obtained from one-pot simple blending method, particles formed by phase segregation between the ZPU and APU were distributed throughout the entire cross-sectional area (FIG. 4(*b*)). The subpar coating film homogeneity and integrity are expected to compromise mechanical durability for long-term application. FIG. 4(*c*) displays the morphology of the inter-diffused PU coating, showing that a homogeneous morphology without distinct boundary between ZPU and APU was obtained. Phase separation was substantially prevented since the semi-cured APU polymer base has lower degree of freedom compared with freshly prepared APU coating solution. To further confirm the ZPU was successfully incorporated into the bulk region of the coating film, EDS mapping was performed for sulfur atoms since they are only present in the zwitterionic moieties (FIG. 4(*d*)). The existence of ZPU in the bulk area enabled long-lasting surface hydrophilicity even when the surface was mechanically abraded upon long-term use.

Confocal laser scanning microscopy (CLSM). CLSM imaging was also utilized to measure the amount of ZPU anchored into the antibacterial PU coating. The depth of the inter-diffusion layer was measured using CLSM (Eclipse Ti—U, Nikon) with a 10× objective lens. The distribution of the ZPU was visualized by immersing the PU coating into fluorescein 5(6)-isothiocyanate (FITC) aqueous solution for 24 h, followed by rinsing with DI water three times. FIGS. 4(*e*) and 4(*f*) depict the cross-sectional areas of both APU coating and inter-diffused coatings, respectively. As a result, an average thickness of ~122 μm was detected which further exemplified that ZPU can diffuse into APU coating base.

Figure 5:
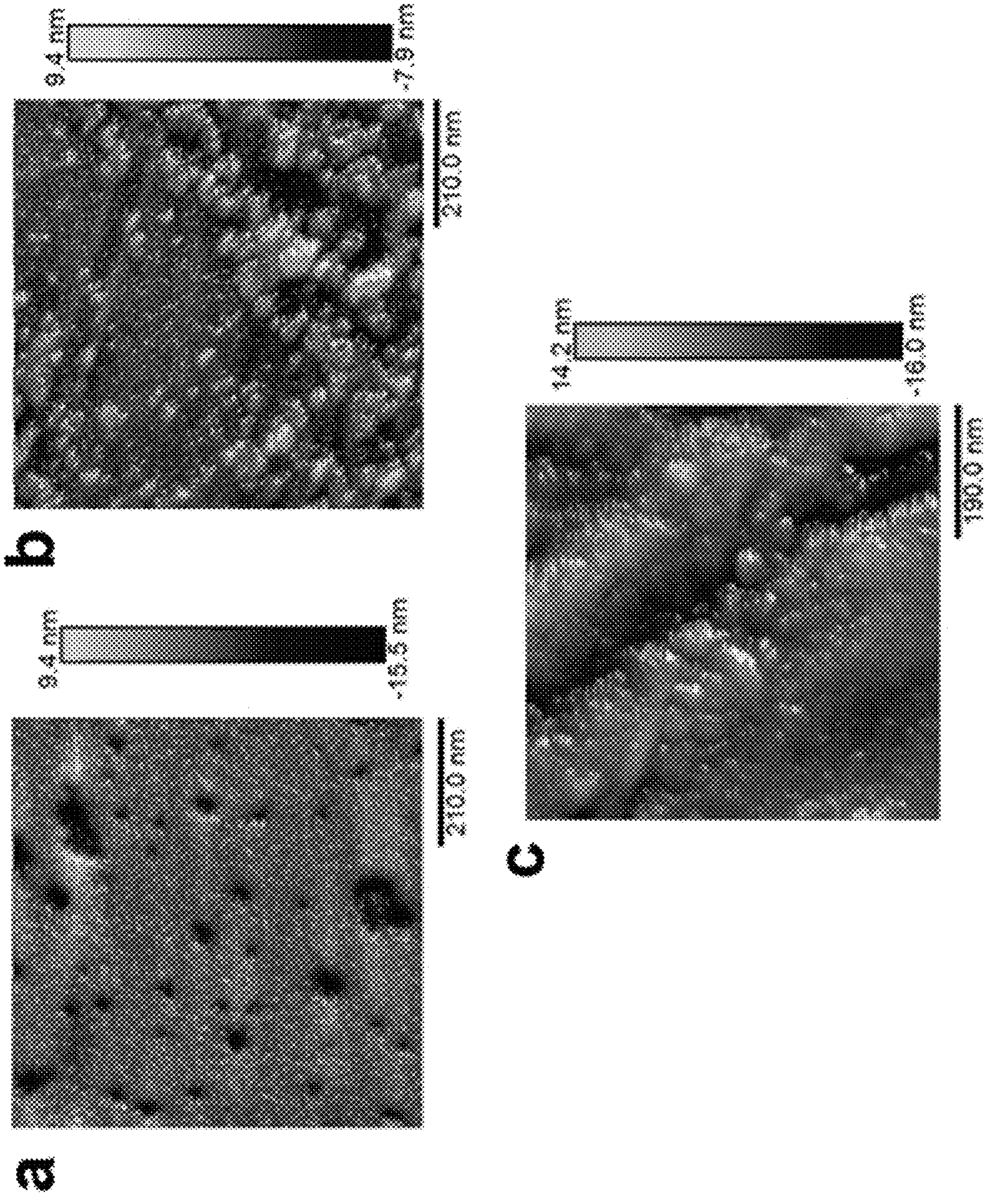
FIG. 5 shows tapping mode AFM images of (a) APU coating, (b) antibacterial PU coating prepared by one-pot simple blending method, and (c) inter-diffused antibacterial PU coating.

Atomic force microscopy (AFM). The surface topography and roughness were investigated using an AFM (MultiMode 8 SPM, Bruker) with ScanAnasyst-Air probe. The deflection sensitivity of the probe was calibrated to a value of 32.84 nm/V and the thermal tune was performed by adjusting spring constant to 0.881 N/m. The surface topography and roughness of the PU coatings were measured with tapping mode AFM. FIG. 5 shows tapping mode AFM images of (a) APU coating, (b) antibacterial PU coating prepared by one-pot simple blending method, and (c) inter-diffused antibacterial PU coating, respectively. As shown in FIG. 5(*a*), a relatively smooth surface was observed from APU coating with a surface roughness ($R_q$) of 1.82 nm. However, the antibacterial PU coating prepared by one-pot simple blended route showed protrusions due to the presence of the ZPU (FIG. 5(*b*)). An increased surface roughness of 3.24 nm was observed due to the presence of ZPU. Since higher surface roughness can facilitate bacterial attachment through mechanical interlocking, the simple blending method was thus not favorable for constructing bacteria-repelling surfaces. FIG. 5(*c*) shows the surface morphology of inter-diffused PU coating, having a characteristic surface topography with reduced roughness ($R_q$=2.23 nm) compared to simple blending technique. The reduced roughness was obtained because the APU base was substantially cured when the ZPU solution was sprayed, thus the majority of ZPU chains was retained on the surface.

Figure 6:
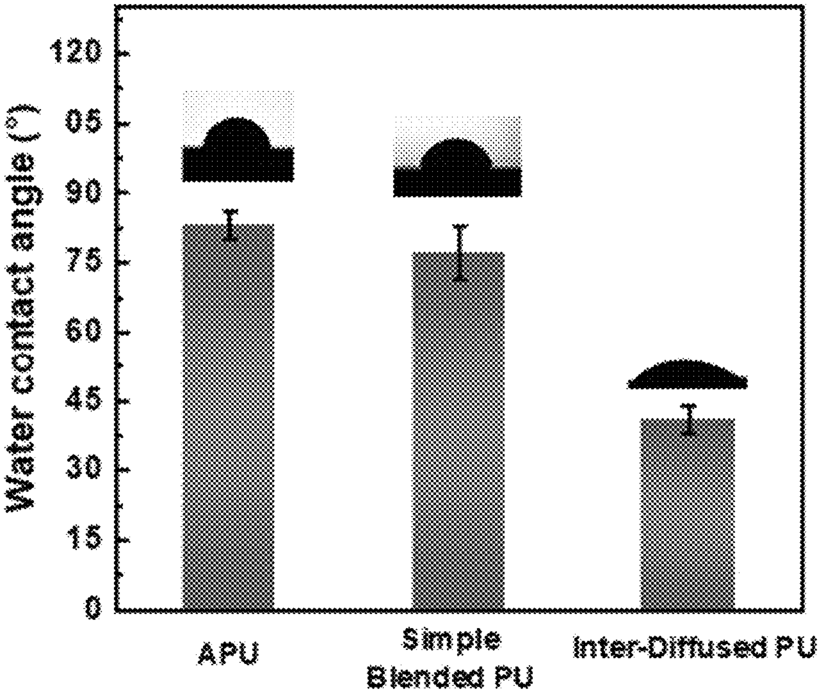
FIG. 6 shows water contact angle (WCA) of the APU coating, antibacterial PU coating prepared by one-pot simple blending method, and inter-diffused antibacterial PU coating prepared by spray coating.

Surface hydrophilicity—Water contact angle (WCA). The surface hydrophilicity of the PU coatings was assessed by measuring WCA using a custom-built optical tensiometer. 5 μL of DI water was pipetted onto five random spots of PU coating surfaces. Next, the WCA was recorded by a CCD camera after 5 min then measured with ImageJ software. Because ZPU can bind water molecules via electrostatic attraction, the surface hydrophilicity of the PU coatings will decrease after incorporated ZPU. FIG. 6 shows water contact angle (WCA) of the APU coating, antibacterial PU coating prepared by one-pot simple blending method, and inter-diffused antibacterial PU coating prepared by spray coating. As seen in FIG. 6, the WCA of APU (83.3°) reduced to 77.2° and 40.9° for the antibacterial PU coatings fabricated by one-pot simple blending and two-step spray coating, respectively. Due to the higher surface tension of the hydrophilic ZPU compared to the other hydrophobic components, ZPU preferably present in the interior of the coatings which led to slightly reduced WCA for coating fabricated by simple blended technique. The hydrophilicity of the PU coatings further confirmed two-step spray coating can effectively preserve ZPU on the surface which is a key factor to achieve bacteria-repelling coatings.

Bacterial attachment assay. Bacterial settlement and proliferation on coating surfaces initiate with the irreversible attachment of the planktonic bacterial cells. Once sufficient bacterial cells and extracellular polymeric substances (EPS) are produced, the mature biofilm will be no longer susceptible to the bacteria-repelling of hydration layers on PU coatings. Thus, inhibition of bacterial attachment from initial state is crucial to achieve highly antibacterial surfaces. This inhibition was evaluated with the PU coating samples. *Escherichia coli* BL21 with GFP was transferred from plate culture into Luria-Bertani broth containing 100 μg/mL of ampicillin with a sterile inoculation loop. The LB broth was then incubated at 37° C. for 24 h with shaking at 200 rpm. A secondary culture was obtained by inoculating 250 mL of sterile LB broth using 5 mL broth from the primary culture to obtain bacteria in exponential growth phase. Afterward, the bacterial cell pellets were collected by centrifugation at 6000 rpm for min followed by washing with 10 mM PBS buffer three times. The final bacterial suspension was obtained by diluting the PBS buffer to a cell concentration of ~$10^8$ cells/mL using UV-Vis spectrophotometry (VWR UV-1600PC). The bacterial attachment assay was conducted by pipetting 70 μL of bacterial suspension onto PU coating samples and allowed to settle at room temperature for 1 h. Next, the samples were rinsed gently with PBS buffer to remove loosely attached bacteria. The attached bacteria were quantified by CLSM imaging with a 20× objective.

*Staphylococcus aureus* bacterial attachment assay was performed using similar procedure described above. Since *S. aureus* cannot produce fluorescence protein, nucleic acid stain (SYTO9) was used for enabling CLSM imaging.

Figure 7:
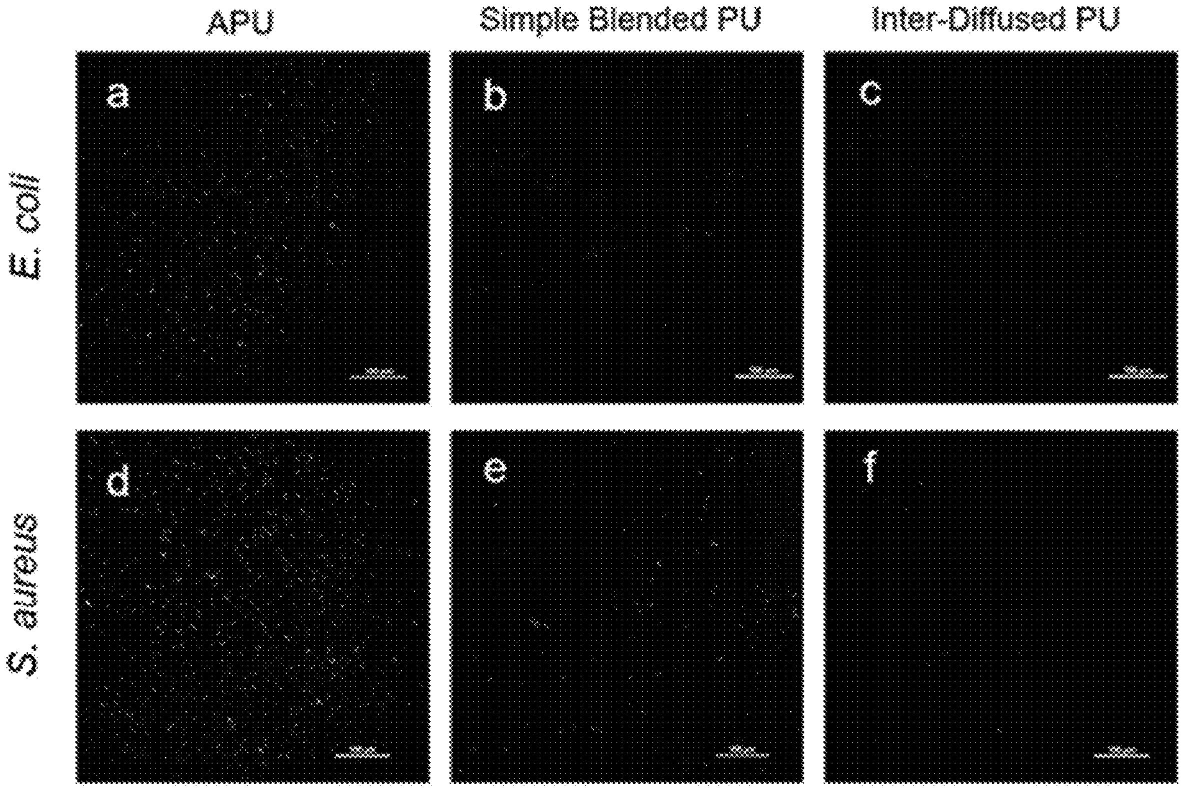
FIG. 7 shows CLSM images for *E. coli* and *S. aureus* bacterial attachment on the (a), (d) APU coating, (b), (e) antibacterial PU coating prepared by one-pot simple blending method, and (c), (f) inter-diffused antibacterial PU coating, and (g) quantitative measurements of the bacterial attachment on the PU coatings.
Figure 7:
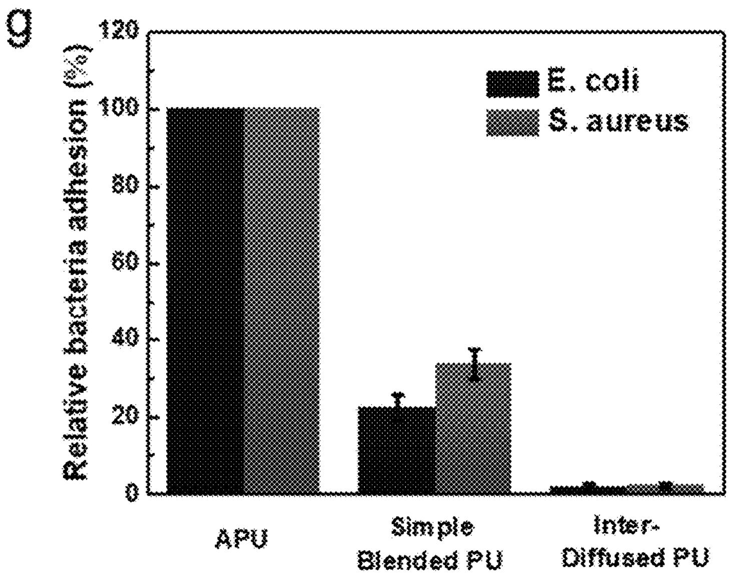

Attachment of bacterial cells and miniature colonies on the PU coatings after 1 h immersion in the bacterial suspension was evaluated. FIG. 7 shows CLSM images for *E. coli* and *S. aureus* bacterial attachment on the (a), (d) APU coating, (b), (e) antibacterial PU coating prepared by one-pot simple blending method, and (c), (f) inter-diffused antibacterial PU coating, respectively. The scale bars are 100 μm. FIG. 7 also shows (g) quantitative measurements of the bacterial attachment on the PU coatings. The amount of bacterial cells adhered to the one-pot simple blended PU coating exhibited a relative bacteria adhesion of 22.37±3.24% and 33.60±3.79% for both Gram-negative *E. coli* and Gram-positive *S. aureus* bacteria compared to commercialized APU. Moreover, minimum bacterial cells were observed from the inter-diffused PU coatings with relative bacteria adhesion of 2.1±0.75% and 2.2±0.73% for *E. coli* and *S. aureus*, respectively. The diminished bacterial adhesion obtained by allowing inter-diffusion between the ZPU and APU was essentially attributed to the reduced surface roughness and enhanced surface hydrophilicity.

Biofilm formation assay. Biofilm formation on high touch surfaces as a consequence of frequent bacterial settlement and subsequent procreation has imposed many problems in daily life including spread of pathogenic microorganisms related to pandemic, complication of the condition of patients with compromised immune systems, and the like. The long-term biofilm formation on PU coatings was investigated by allowing bacteria to attach and proliferate on PU coatings for 5 days. The coating samples were continuously tested for bacterial attachment for 5 days. To ensure the viability of the bacteria, the bacterial suspension was replaced on a daily basis. The formation of biofilms for both *E. coli* and *S. aureus* bacteria was determined by CLSM through FITC channel and quantified by image binary processing. The 3D images were re-constructed with NIS Elements AR software.

Figure 8:
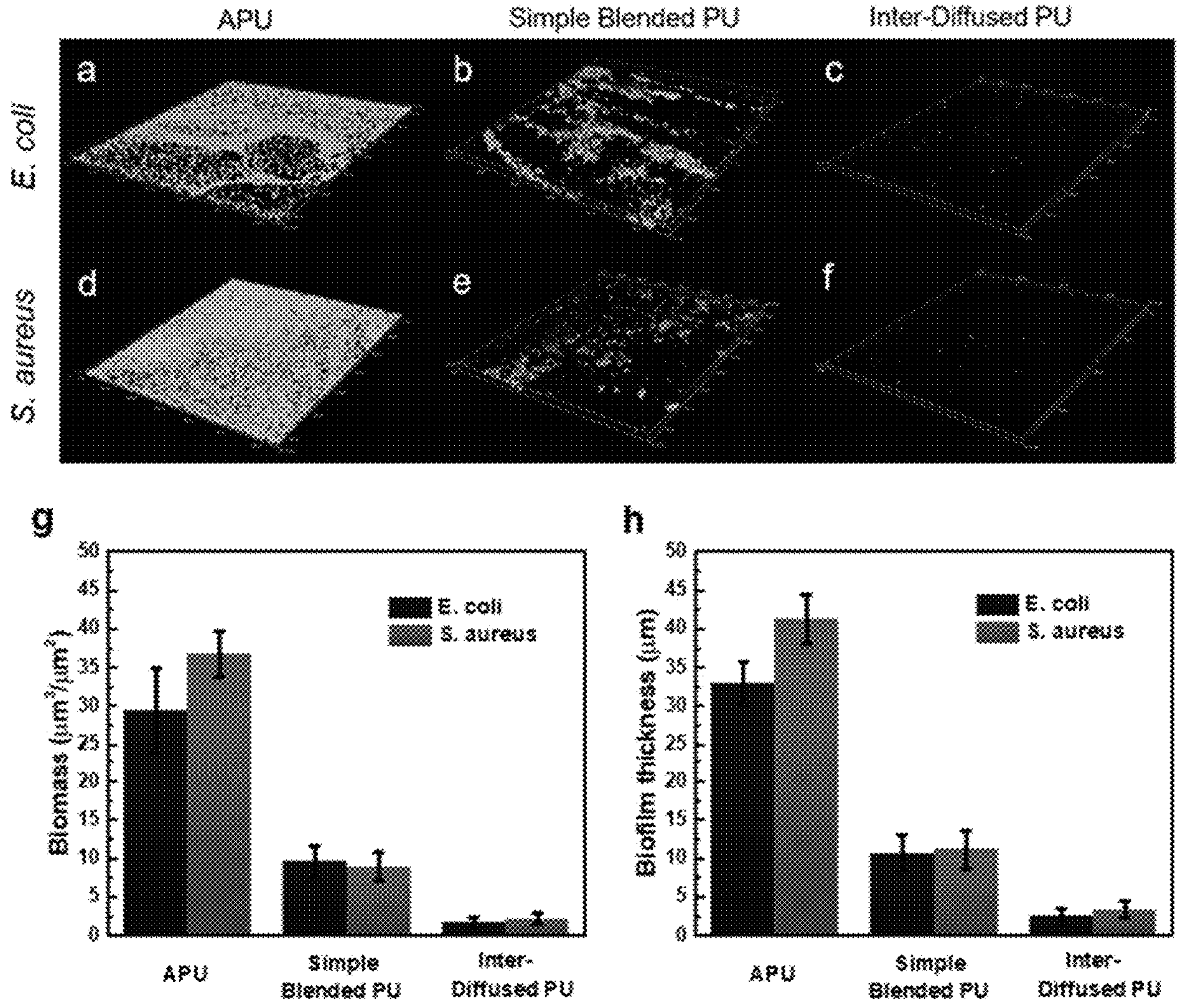
FIG. 8 shows CLSM images for *E. coli* and *S. aureus* biofilm formation over 5 days on the (a), (d) APU coating, (b), (e) antibacterial PU coating prepared by one-pot simple blending method, and (c), (f) inter-diffused antibacterial PU coating, and quantitative measurements of the (g) biomass and (h) average thickness of the biofilms on the PU coatings.

The 3D reconstruction of the biofilms as well as the biomass and biofilm thickness are shown in FIG. 8. FIG. 8 shows CLSM images for *E. coli* and *S. aureus* biofilm formation over 5 days on the (a), (d) APU coating, (b), (e) antibacterial PU coating prepared by one-pot simple blending method, and (c), (f) inter-diffused antibacterial PU coating, respectively. The scan range was 300 μm×300 μm. FIG. 8 also shows quantitative measurements of the (g) biomass and (h) average thickness of the biofilms on the PU coatings. For the APU coating, heavy and robust biofilms were observed due to the surface hydrophobicity. However, limited biofilms were detected from the simple blended PU coating owing to the presence of hydrophilic ZPU on the surface, the bacteria may selectively adhere to the APU domains due to the hydrophobic interaction. As for the inter-diffused PU coating, remarkable antibacterial efficacy was achieved because of the enrichment of ZPU on the surface and the desired film homogeneity.

Figure 9:
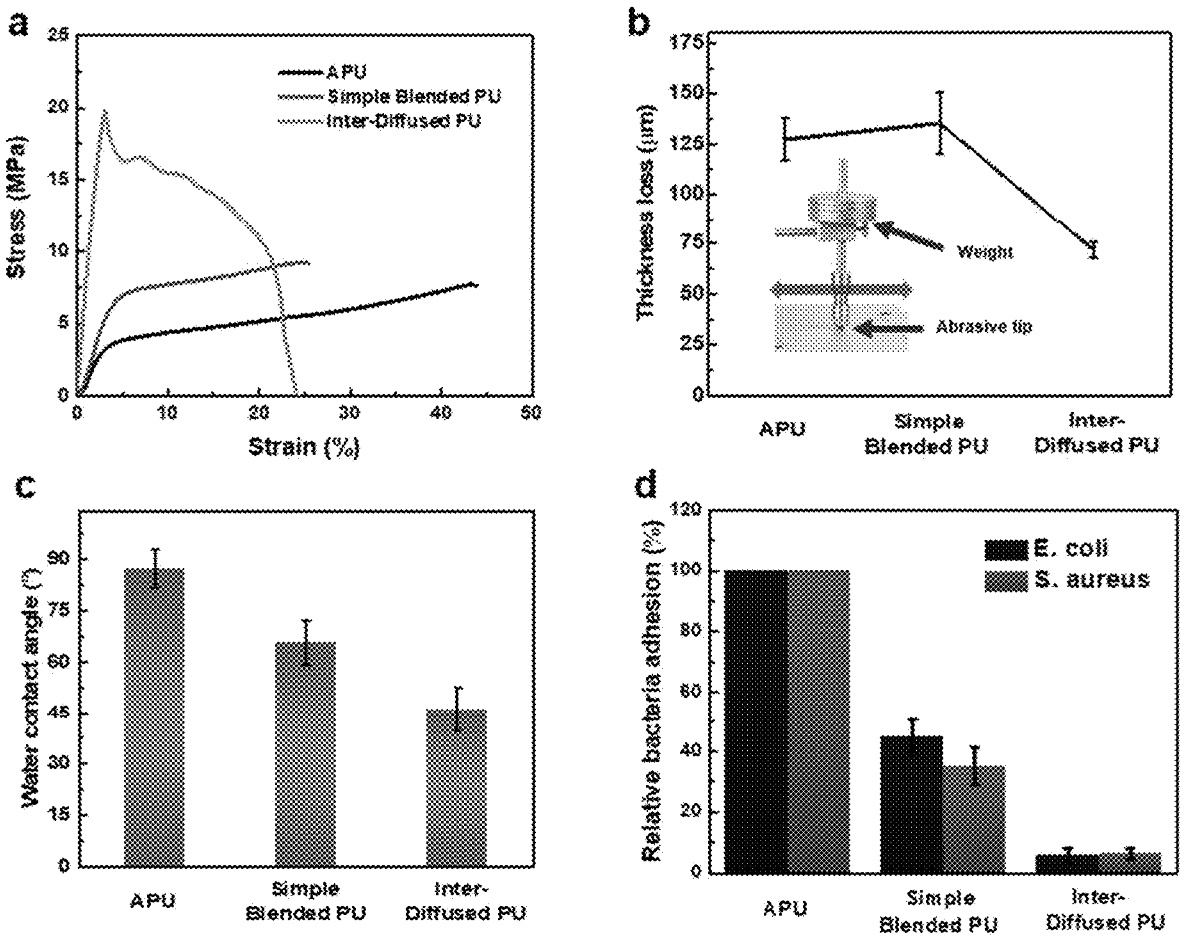
FIG. 9 shows (a) Tensile stress-strain curves for the APU coating, antibacterial PU coating prepared by one-pot simple blending method, and inter-diffused antibacterial PU coating, (b) Thickness loss for the PU coatings after mechanically abraded for 1000 cycles, (c) WCAs for the PU coatings after abrasion test, and (d) Relative bacteria attachment on the abrasion tested PU coatings compared to the abraded APU coating.

Durability test—Tensile testing. The tensile mechanical properties were tested to confirm the durability of the antibacterial PU coatings. The tensile strength and toughness of the PU coatings were tested with a texture analyzer (TA.XT.Plus, Texture Technologies Corp, MA) by elongating the test specimens at a rate of 1 mm/min. The coating solution were first casted into a Teflon dish then dried at 85° C. under vacuum for 24 h. The test specimens were obtained by stamping a rectangular strip (20 mm×5 mm×0.5 mm) from the dried coating film. FIG. 9 shows (a) Tensile stress-strain curves for the APU coating, antibacterial PU coating prepared by one-pot simple blending method, and inter-diffused antibacterial PU coating, and (b) Thickness loss for the PU coatings after mechanically abraded for 1000 cycles. The inset shows the abrasion test setup. FIG. 9 also shows (c) WCAs for the PU coatings after abrasion test and (d) Relative bacteria attachment on the abrasion tested PU coatings compared to the abraded APU coating.

As shown in FIG. 9(*a*), the pristine APU displayed relatively low tensile strength with a modulus of toughness of 2.31 MPa. For the simple blended PU coating, enhanced tensile strength but reduced fracture elongation was obtained. The overall toughness was 1.87 MPa which was ascribed to the phase segregation between APU and ZPU. A low yield tensile profile with gradual fracture was measured from the inter-diffused coating with a toughness of 3.14 MPa. Since there was no soft segment in the ZPU, the polymer displayed brittle behavior upon tensile elongation. Since the inter-diffused coating has enriched ZPU on the surface, the breaking from the ZPU-rich side propagated to the APU-rich side which led to a continuously decreasing profile. The tensile durability test has thus verified the reinforcing of ZPU using APU base by enhancing its ductility.

Mechanical abrasion as a ubiquitous damage to the coating surface is a key factor contributed to the failure of long-term surface hydrophilicity. The durability of the PU coatings against abrasion were tested using a reciprocating mechanical abrader. Specifically, the coating specimens were subjected to an abrasion force of 2.5 N from an abrasive tip (Wearaser H-18, Taber Industries) for 1000 cycles, and the thickness loss was then measured by a stylus profilometer. As shown in FIG. 9(*b*), a maximum thickness loss of 135.52±15.14 μm was measured from a simple blended coating compared to 127.48±10.68 μm for APU and 71.98±3.90 μm for an inter-diffused coating, indicating ZPU has superior mechanical durability upon rigorous abrasion. To exemplify the antibacterial potency of the PU coatings after mechanical abrasion, WCAs were determined to corroborate that surface hydrophilicity was retained after the coatings were impaired by long-term mechanical destruction. As a result, the inter-diffused coating only slightly increased by 6° which was owing to the presence of ZPU in the interior of the coating (FIG. 9(*c*)). FIG. 9(*d*) shows the property for inhibiting short term bacterial attachment of the coatings before and after the abrasion test, where the inter-diffused coating exhibited acceptable increment for the attached bacterial cells. The increase of adhesion of the bacteria was potentially attributed to the enhanced mechanical interlocking of the bacterial cells with surfaces. Surface profilometry was thus also used to measure the surface roughness increment after the abrasion test. Surface roughnesses were increased to 290.15 nm, 247.01 nm, and 162.76 nm for APU, simple blended, and inter-diffused PU coatings, respectively. The minimal roughness of 162.76 nm observed from the inter-diffused PU coating was attributed to the enrichment of ZPU on the surface.

Figure 10:
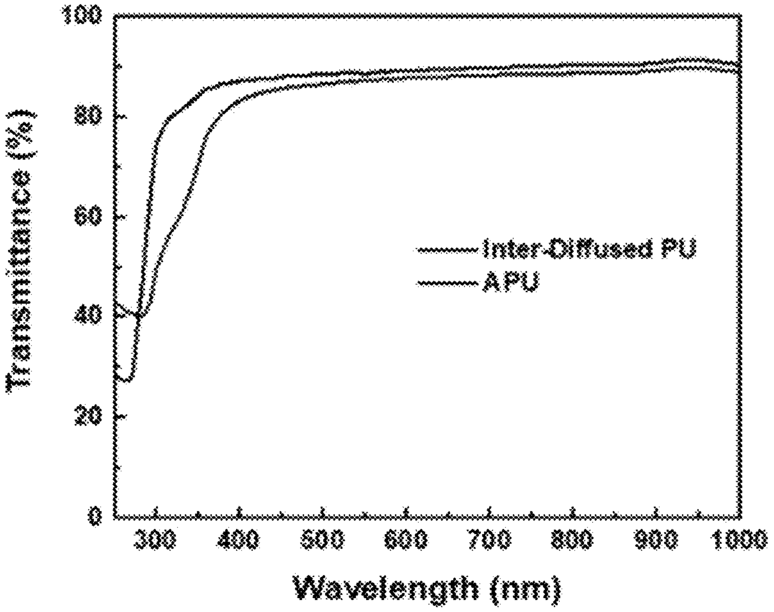
FIG. 10 shows transmittance spectra for the APU and inter-diffused antibacterial PU coatings.

To ensure the feasibility for practical applications, the inter-diffused PU coating was coated onto black vinyl tarpaulin to showcase the coating in a holistic perspective. In detail, a highly glossy and transparent coating is generally desired due to aesthetic purpose. FIG. 10 displays the transmittance curves for both APU and inter-diffused PU coating, with both coatings showing a high transmittance of above 85% for a wavelength greater than ~450 nm. The coated vinyl tarpaulin was also tested by twisting and folding and was visually inspected to confirm no delamination or debris were formed on the folding line. The cross-hatch adhesion and pencil hardness test were also performed to examine the durability of the coated tarpaulin. As a result, a highest adhesion rating of 5B was obtained since no obvious detached flakes were observed on the hatching line after tape peeling. Moreover, a pencil hardness grade of 5H was obtained when pencil hardness testing vehicle was loaded with 750 g weight. Note that the maximum rating is 6H. These results offered insights for the practical application of the inter-diffused PU coating.

What is claimed is:

1. An antibacterial polyurethane coating prepared by a method comprising:

depositing an acrylic polyurethane base layer on a surface, wherein the acrylic polyurethane base layer is hydrophobic and comprises a ratio of hydroxyl groups to isocyanate groups of about 1.0/1.5;

allowing the acrylic polyurethane base layer to partially cure, to produce a semi-cured acrylic polyurethane base layer;

spraying a zwitterionic polyurethane on the semi-cured acrylic polyurethane base layer, wherein the zwitterionic polyurethane is hydrophilic and comprises a ratio of hydroxyl groups to isocyanate groups of about 1.1/1.0;

allowing the zwitterionic polyurethane to inter-diffuse into the acrylic polyurethane base layer to form an inter-diffused polyurethane coating; and allowing the inter-diffused polyurethane coating to cure to form an antibacterial polyurethane coating, wherein the antibacterial polyurethane coating has a coating surface that is hydrophilic and lacks isocyanate groups.

2. The antibacterial polyurethane coating of claim 1, wherein the zwitterionic polyurethane has a structure of:

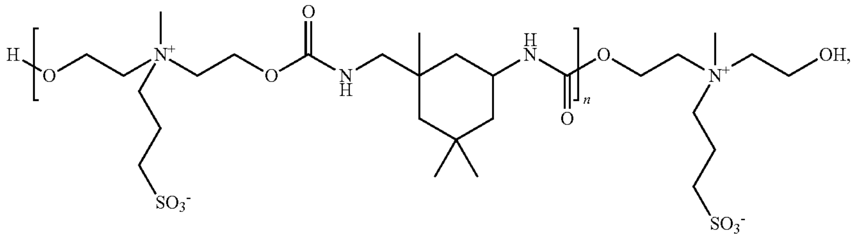

wherein n is between 2 and 70.

3. The antibacterial polyurethane coating of claim 1, wherein the antibacterial polyurethane coating comprises molecules having a structure of:

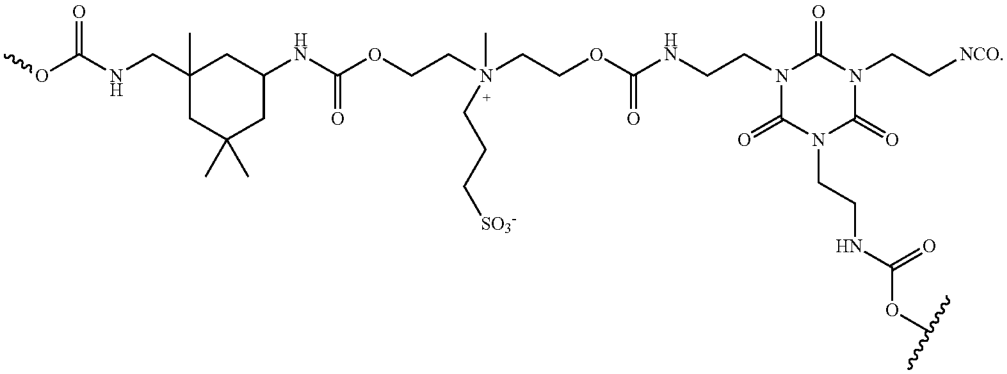

4. The antibacterial polyurethane coating of claim 1, wherein the antibacterial polyurethane coating inhibits bacterial attachment and biofilm formation on the coating surface.

5. An antibacterial polyurethane coating comprising molecules having a structure of:

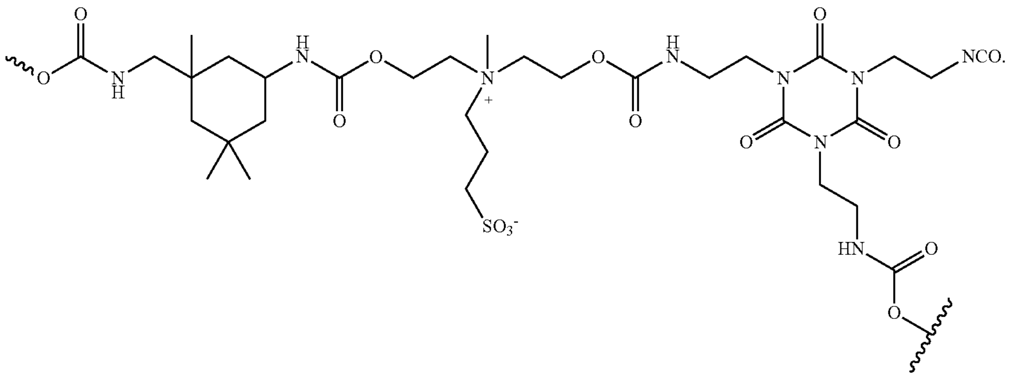
6. The antibacterial polyurethane coating of claim 5, wherein the antibacterial polyurethane coating inhibits bacterial attachment and biofilm formation on the coating surface.
* * * * *